United States Patent Office.

JOHN AHEARN, OF BALTIMORE, MARYLAND.

Letters Patent No. 96,861, dated November 16, 1869.

---

IMPROVED COMPOSITION FOR DESTROYING INSECTS ON FLOWERS, PLANTS, AND BUSHES.

---

The Schedule referred to in these Letters Patent and making part of the same.

---

To all whom it may concern:

Be it known that I, JOHN AHEARN, of the city and county of Baltimore, and State of Maryland, have invented a new and improved Composition for Destroying Insects on Flowers, Plants, Vines, and Bushes; and I do hereby declare that the following is a full, clear, and exact description of the same.

I first make a composition from the following ingredients, which I mix well together in any suitable vessel, in about the proportions stated:

To thirty gallons of stable liquor or rain-water, I add one pound of carbonate of ammonia, one pound of potash, one gallon of whale-oil, and one quart of coal-tar.

After this composition has stood about six hours, I add to it ten gallons of rain-water, one pound of Paris-green, and one pound of powdered white hellebore.

I then mix the whole well together, and apply by sprinkling, using a whisk of hay, watering-pot, or other convenient article suitable for the purpose.

What I claim as my invention, and wish to secure by Letters Patent, is—

The composition compounded of the above-named ingredients, and applied for the protection of trees, vines, and plants, substantially as set forth.

J. AHEARN.

Witnesses:
CHAS. A. PETTIT,
N. K. ELLSWORTH.